(12) United States Patent
Park et al.

(10) Patent No.: US 12,506,164 B2
(45) Date of Patent: Dec. 23, 2025

(54) FUEL CELL SYSTEM AND METHOD OF CONTROLLING SAME

(71) Applicants: Hyundai Motor Company, Seoul (KR); Kia Corporation, Seoul (KR)

(72) Inventors: Jun Young Park, Gyeonggi-do (KR); Hee Mang Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 554 days.

(21) Appl. No.: 18/101,422

(22) Filed: Jan. 25, 2023

(65) Prior Publication Data

US 2024/0039020 A1 Feb. 1, 2024

(30) Foreign Application Priority Data

Jul. 27, 2022 (KR) .................. 10-2022-0093283

(51) Int. Cl.
| | |
|---|---|
| *H01M 8/04* | (2016.01) |
| *H01M 8/04291* | (2016.01) |
| *H01M 8/0438* | (2016.01) |
| *H01M 8/0444* | (2016.01) |
| *H01M 8/04492* | (2016.01) |
| *H01M 8/04746* | (2016.01) |

(52) U.S. Cl.
CPC ... *H01M 8/04291* (2013.01); *H01M 8/04432* (2013.01); *H01M 8/04462* (2013.01); *H01M 8/04514* (2013.01); *H01M 8/04761* (2013.01)

(58) Field of Classification Search
CPC ......... H01M 8/04291; H01M 8/04432; H01M 8/04462; H01M 8/04514; H01M 8/04761
USPC ......................................................... 429/450
See application file for complete search history.

(56) References Cited

U.S. PATENT DOCUMENTS

| | | | | |
|---|---|---|---|---|
| 2012/0148927 | A1* | 6/2012 | Jeon | H01M 8/04843 |
| | | | | 429/414 |
| 2018/0339603 | A1* | 11/2018 | Shim | B60L 58/31 |
| 2020/0136158 | A1* | 4/2020 | Park | H01M 8/04589 |
| 2021/0180707 | A1* | 6/2021 | Shim | H01M 8/04753 |
| 2022/0102744 | A1* | 3/2022 | Ando | H01M 8/04119 |

FOREIGN PATENT DOCUMENTS

KR 10-2021-0074834 A 6/2021

\* cited by examiner

*Primary Examiner* — James M Erwin
(74) *Attorney, Agent, or Firm* — Fox Rothschild LLP

(57) ABSTRACT

Proposed are a fuel cell system and a method of controlling the fuel cell system. The fuel cell system may comprise a discharge valve configured to adjust a flow rate between an inlet and an outlet, connected at the inlet to a water trap connected to an anode of a fuel cell stack, and connected at the outlet to an external exhaust line, and a controller configured to derive an error value on the basis of a difference between condensate water production amount and discharge amount of the anode of the fuel cell stack when the discharge valve is in an open state, configured to correct the condensate water production amount of the anode on the basis of the error value when the discharge valve is in a closed state, and configured to open the discharge valve when the corrected condensate water production amount exceeds a predetermined first reference value.

15 Claims, 4 Drawing Sheets

FUEL CELL SYSTEM AND METHOD OF CONTROLLING SAME

CROSS REFERENCE TO RELATED APPLICATION(S)

The present application claims, under 35 U.S.C. § 119(a), the benefit of Korean Patent Application No. 10-2022-0093283, filed on Jul. 27, 2022, the disclosure of which is incorporated herein by reference in its entirety.

BACKGROUND

Technical Field

Embodiments of the present disclosure relate to a fuel cell system and a method of controlling the fuel cell system and, in particular, to a fuel cell system configured to correct a condensate water production amount estimation value of an anode of a fuel cell stack and open a discharge valve on the basis of the corrected condensate water production amount, and a method of controlling the fuel cell system.

Background

Recently, eco-friendly vehicles, including electric vehicles (EVs) driven by electrical energy, have been increasingly popularized with economic benefits over internal combustion engine vehicles.

Eco-friendly vehicles include, e.g., hybrid electric vehicles (HEVs) that provide a driving force to a motor using electrical energy stored in an automotive high-voltage battery together with an existing internal combustion engine, fuel cell electric vehicles (FCEVs) that provide a driving force to a motor using electrical energy generated by a fuel cell, etc.

A fuel cell that is mounted on an FCEV is a device that is supplied with hydrogen, air, etc. from the outside and generates electrical energy using an electrochemical reaction in a fuel cell stack. A FCEV may comprise a fuel cell stack formed by stacking fuel cells that are used as power sources, a fuel supply system supplying hydrogen that is fuel to the fuel cell stack, an air supply system supplying oxygen that is an oxidizer required for an electrochemical reaction, a heat management system using cooling water, etc. to control the temperature of the fuel cell stack, etc.

The fuel supply system may be configured to depressurize and supply compressed hydrogen in a hydrogen tank to an anode of the fuel cell stack. The air supply system may be configured to supply external air suctioned by operating an air compressor to a cathode of the fuel cell stack.

When hydrogen is supplied to the anode of a fuel cell stack, an oxidation reaction of the hydrogen may occur at the anode, so protons and electrons are produced. Further, the protons and electrons produced in this process may move to the cathode through an electrolyte membrane and a separator. Water may be produced at the cathode by an electrochemical reaction of the protons, and electrons, having moved from the anode and oxygen in the air, and an electrical energy may be generated by this flow of the electrons.

The water produced by the electrochemical reaction may be discharged with exhaust gas (non-reacting hydrogen and oxygen) to the outside from a vehicle. Since the exhaust gas comprises a small amount of non-reacting hydrogen, at present, the hydrogen emission concentration of fuel cell electric vehicles is globally limited by rules.

At present, the maximum allowable concentration of hydrogen gas that is discharged from fuel cell systems under Global Technical Regulation (GTR) that is being globally applied is 8% or less, and the average measured for 3 seconds should not exceed 4%.

Meanwhile, improving the performance of a fuel cell is a very important matter to be solved in the technological field of FCEVs.

The higher the reaction efficiency of hydrogen and oxygen, the more the performance of a fuel cell may be improved. However, the more the unnecessary substances (nitrogen, water, etc.) moving to an anode through an electrolyte membrane in a fuel cell stack, the smaller the amount of hydrogen in the anode, so a reaction efficiency may decrease. Accordingly, a purge valve that purges foreign substances and hydrogen in accordance with a predetermined cycle may be provided.

That is, a purge valve for purging hydrogen may be installed at an anode outlet of a fuel cell, and hydrogen of the anode may be periodically discharged, whereby unnecessary substances may be also discharged and removed and a use rate of hydrogen is increased.

Further, a water trap that may collect and discharge water, which is a byproduct of an electrochemical reaction, to an air humidifier may be provided at the anode of a fuel cell. In this case, a drain line for discharging water to the air humidifier may be connected to the water trap and a drain valve for discharging water in the water trap may be provided in the drain line.

However, the purge valve may be controlled on the basis of the concentration of hydrogen in the anode, and the water in the water trap may be discharged by controlling the drain valve on the basis of the water level in the water trap that is measured by a water level sensor. Such control has a defect that a purge valve, a drain valve, and a water level sensor are separately needed.

Accordingly, as disclosed in Korean patent publication document KR 10-2021-0074834 A, a technology that applies an integrated valve of a purge valve and a drain valve, which were used in the related art, and may be configured to control the integrated valve even without a water level sensor has been proposed.

However, according to this technology of the related art, when an estimated production amount of condensate water (water) at an anode is smaller than the actual production amount, the integrated valve is not opened, so the condensate water exceeds the capacity of a water trap, whereby a flooding phenomenon in which water is excessively accumulated in a fuel cell may occur.

Further, when a driver suddenly accelerates a vehicle, it may be required to quickly secure hydrogen concentration of an anode in order to satisfy request power of the vehicle. However, when condensate water exceeds the capacity of the water trap, gas cannot be discharged within the time for which the condensate water is discharged even though the integrated valve is opened, so there is a problem that hydrogen concentration of the anode cannot be quickly secured.

Accordingly, it is substantially urgent to provide a technology that can more accurately estimate a condensate water production amount of an anode.

The description provided above as a related art of the present disclosure is just for helping to understand the background of the present disclosure and should not be construed as being included in the related art known by those skilled in the art.

SUMMARY

The present disclosure has been made in an effort to solve the problems described above and an objective of the present disclosure is to provide a fuel cell system configured to improve reliability in control by correcting a condensate water production amount estimation value of an anode of a fuel cell stack and opening a discharge valve on the basis of the corrected condensate water production amount, and a method of controlling the fuel cell system.

A fuel cell system according to an exemplary embodiment of the present disclosure for achieving the objectives may comprise: a discharge valve configured to adjust a flow rate between an inlet and an outlet, wherein the discharge valve may be connected at the inlet to a water trap connected to an anode of a fuel cell stack, and connected at the outlet to an external exhaust line, and a controller configured to derive an error value on the basis of a difference between condensate water production amount and discharge amount of the anode of the fuel cell stack when the discharge valve is in an open state, configured to correct the condensate water production amount of the anode on the basis of the error value when the discharge valve is in a closed state, generating a corrected condensate water production amount, and configured to open the discharge valve when the corrected condensate water production amount exceeds a predetermined first reference value.

The controller of the fuel cell system according to an exemplary embodiment of the present disclosure may be configured to derive a differential pressure table of an inlet pressure and an outlet pressure of the discharge valve when the discharge valve is in an open state, and may be configured to calculate a condensate water discharge amount of the anode of the fuel cell stack on the basis of the differential pressure table.

The controller of the fuel cell system according to an exemplary embodiment of the present disclosure may be configured to calculate a first differential pressure accumulation amount while condensate water of the anode of the fuel cell stack is discharged, from the differential pressure table, and may be configured to calculate the condensate water discharge amount of the anode of the fuel cell stack on the basis of the first differential pressure accumulation amount.

The controller of the fuel cell system according to an exemplary embodiment of the present disclosure may be configured to calculate a gas discharge amount of the anode of the fuel cell stack when the discharge valve is in the open state, and may be configured to calculate the first differential pressure accumulation amount on the basis of the gas discharge amount and the differential pressure table.

The controller of the fuel cell system according to an exemplary embodiment of the present disclosure may be configured to calculate a second differential pressure accumulation amount while gas of the anode of the fuel cell stack is discharged, from the differential pressure table on the basis of the gas discharge amount and the differential pressure table, may be configured to calculate a condensate water discharge time of the anode of the fuel cell stack on the basis of the second differential pressure accumulation amount and the differential pressure table, and may be configured to calculate the first differential pressure accumulation amount by integrating differential pressures of the discharge valve for the condensate water discharge time.

The controller of the fuel cell system according to an exemplary embodiment of the present disclosure may be configured to calculate, as the condensate water discharge time, a time at which an accumulation amount of differential pressures, accumulated reversely from a closing time point of the discharge valve, is the same as the second differential pressure accumulation amount in the differential pressure table.

The controller of the fuel cell system according to an exemplary embodiment of the present disclosure may be configured to estimate hydrogen concentration of the anode of the fuel cell stack when the discharge valve is in the closed state, and may be configured to open the discharge valve when the hydrogen concentration of the anode is less than a predetermined second reference value.

The controller of the fuel cell system according to an exemplary embodiment of the present disclosure may be configured to calculate a condensate water discharge delay time of the anode of the fuel cell stack on the basis of the corrected condensate water production amount, and may be configured to estimate hydrogen concentration of the anode on the basis of a diffusion amount of gas in the fuel cell stack for the condensate water discharge delay time.

A method of controlling the fuel cell system according to an exemplary embodiment of the present disclosure is provided. The method may comprise: deriving the error value on the basis of the difference between condensate water production amount and discharge amount of the anode of the fuel cell stack when the discharge valve is in the open state by means of the controller; correcting the condensate water production amount of the anode on the basis of the error value when the discharge valve is in the closed state by means of the controller; and opening the discharge valve when the corrected condensate water production amount exceeds the predetermined first reference value by means of the controller.

According to an exemplary embodiment of the present disclosure, the deriving the error value may comprise, using the controller, deriving a differential pressure table of an inlet pressure and an outlet pressure of the discharge valve when the discharge valve is in the open state, and calculating a condensate water discharge amount of the anode of the fuel cell stack on the basis of the differential pressure table.

According to an exemplary embodiment of the present disclosure, the deriving the error value may comprise calculating a first differential pressure accumulation amount while condensate water of the anode of the fuel cell stack is discharged, from the differential pressure table, and calculating the condensate water discharge amount of the anode of the fuel cell stack on the basis of the first differential pressure accumulation amount.

According to an exemplary embodiment of the present disclosure, the deriving the error value may comprise calculating, using the controller, a gas discharge amount of the anode of the fuel cell stack when the discharge valve is in the open state, and calculating the first differential pressure accumulation amount on the basis of the gas discharge amount and the differential pressure table.

According to an exemplary embodiment of the present disclosure, the deriving the error value may comprise calculating from the differential pressure table, using the controller, a second differential pressure accumulation amount while gas of the anode of the fuel cell stack is discharged on the basis of the gas discharge amount and the differential pressure table, calculating a condensate water discharge time of the anode of the fuel cell stack on the basis of the second differential pressure accumulation amount and the differential pressure table, and calculating the first differential pressure accumulation amount by integrating differential pressures of the discharge valve for the condensate water discharge time.

According to an exemplary embodiment of the present disclosure, the deriving the error value may comprise, using the controller, calculating, as the condensate water discharge time, time at which an accumulation amount of differential pressures accumulated reversely from a closing time point of the discharge valve is the same as the second differential pressure accumulation amount in the differential pressure table.

According to an exemplary embodiment of the present disclosure, the method may comprise calculating a condensate water discharge delay time of the anode of the fuel cell stack on the basis of the corrected condensate water production amount after the correcting of the condensate water production amount of the anode. According to an exemplary embodiment of the present disclosure, the opening the discharge valve may comprise estimating, using the controller, a hydrogen concentration of the anode of the fuel cell stack on the basis of a gas diffusion amount in the fuel cell stack for the condensate water discharge delay time when the discharge valve is in the closed state, and opening the discharge valve when the hydrogen concentration of the anode is less than a predetermined second reference value.

According to the fuel cell system and the method of controlling the fuel cell system of the present disclosure, it may be possible to correct a condensate water production amount estimation value on the basis of a gas discharge amount of the anode and the differential pressure of the discharge valve when the discharge valve is open even without adding a specific device.

According to the fuel cell system and the method of controlling the fuel cell system of the present disclosure, it may be possible to estimate a condensate water production amount of the anode more accurately by correcting the condensate water production amount estimation value of the anode of the fuel cell stack.

According to the fuel cell system and the method of controlling the fuel cell system of the present disclosure, it may be possible to improve reliability in control by opening the discharge valve on the basis of the corrected condensate water production amount.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

Figure 1:
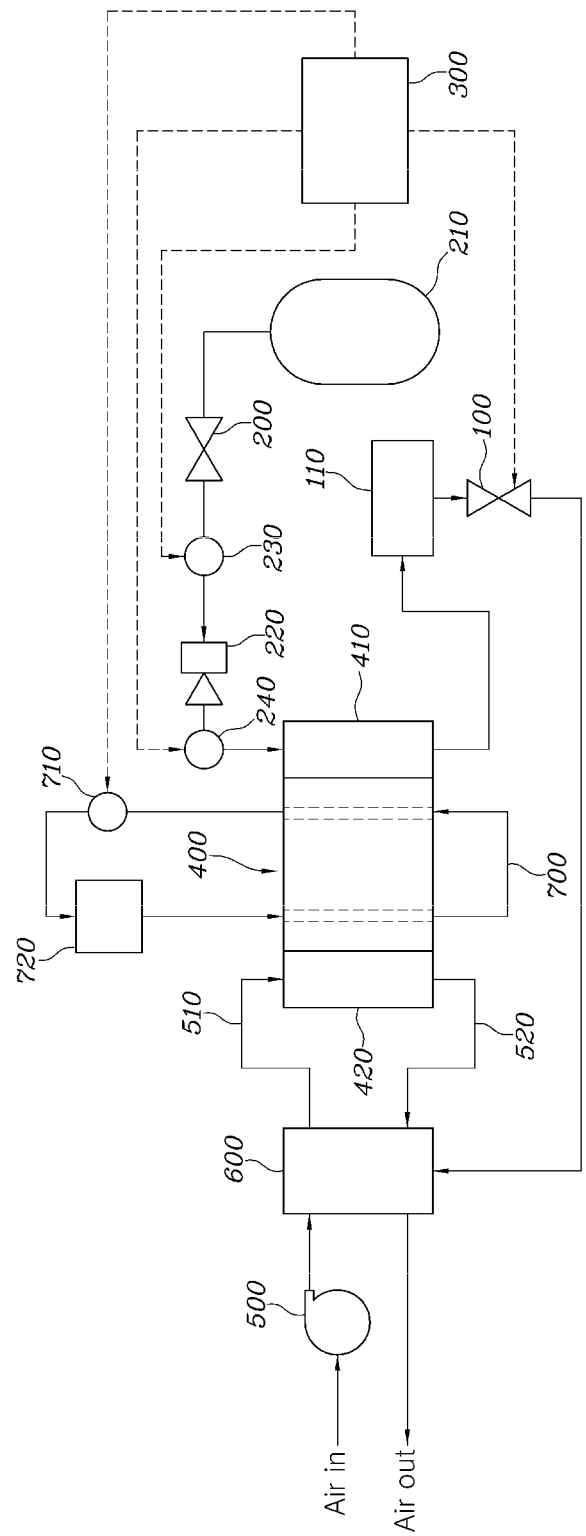
FIG. 1 is a view showing a fuel cell system according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

It will be further understood that the terms "comprises" or "have" used throughout this specification, specify the presence of stated features, steps, operations, components, parts, or a combination thereof, but do not preclude the presence or addition of one or more other features, numerals, steps, operations, components, parts, or a combination thereof.

Terms including ordinal numbers such as "first", "second", etc., may be used to describe various components, but the components are not to be construed as being limited to the terms. The terms are used only to distinguish one component from another component.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure. In the following description, if it is decided that the detailed description of known technologies related to the present disclosure makes the subject matter of the embodiments described herein unclear, the detailed description is omitted. Further, the accompanying drawings are provided only for easy understanding of embodiments disclosed in the specification, the technical spirit disclosed in the specification is not limited by the accompanying drawings, and all changes, equivalents, and replacements should be understood as being included in the spirit and scope of the present disclosure.

A controller 300 according to an exemplary embodiment of the present disclosure may comprise a communication device that may be configured to communicate with another controller 300 or a sensor to control corresponding functions, a memory that may be configured to store an operating system or logic commands and input/output information, and one or more processors that may be configured to perform determination, calculation, decision, etc. for controlling the corresponding functions.

Hereafter, the configuration and operation principle of several embodiments of the present disclosure will be described in detail with reference to the accompanying drawings and the same or similar components are given the same reference numerals regardless of the numbers of figures and are not repeatedly described.

Figure 2:
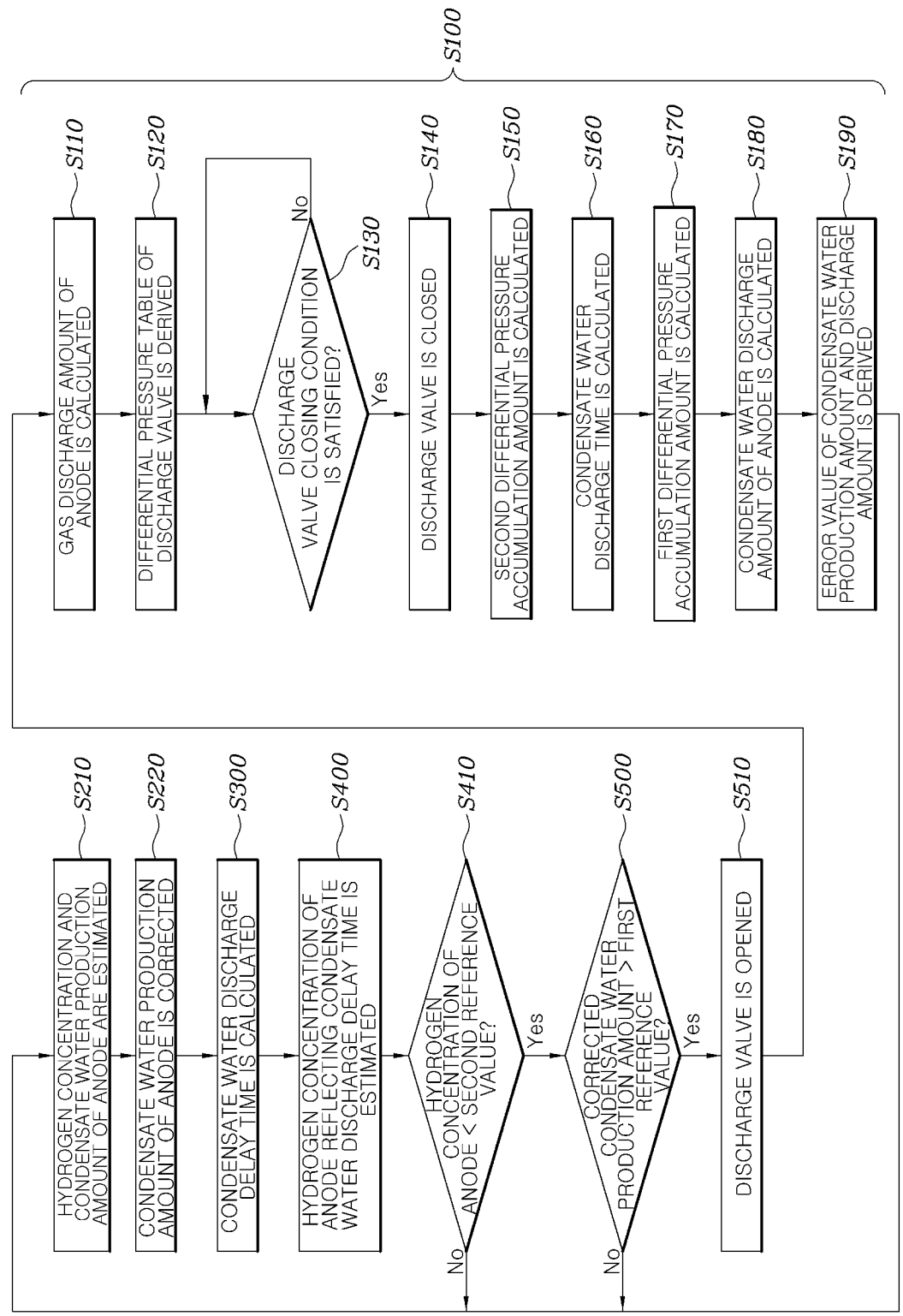
FIG. 2 is a flowchart of a method of controlling a fuel cell system according to an exemplary embodiment of the present disclosure.
Figure 3:
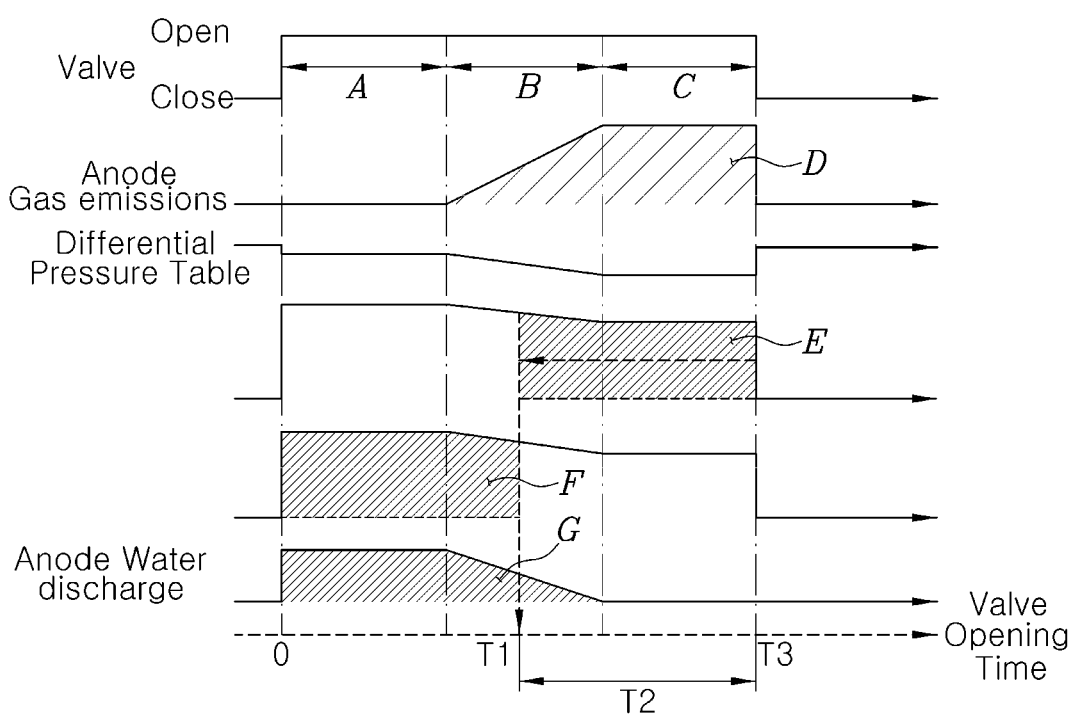
FIG. 3 is a view showing a process of calculating a condensate water discharge amount of an anode of a fuel cell stack on the basis of a differential pressure table of an inlet pressure and an outlet pressure of a discharge valve.
Figure 4:
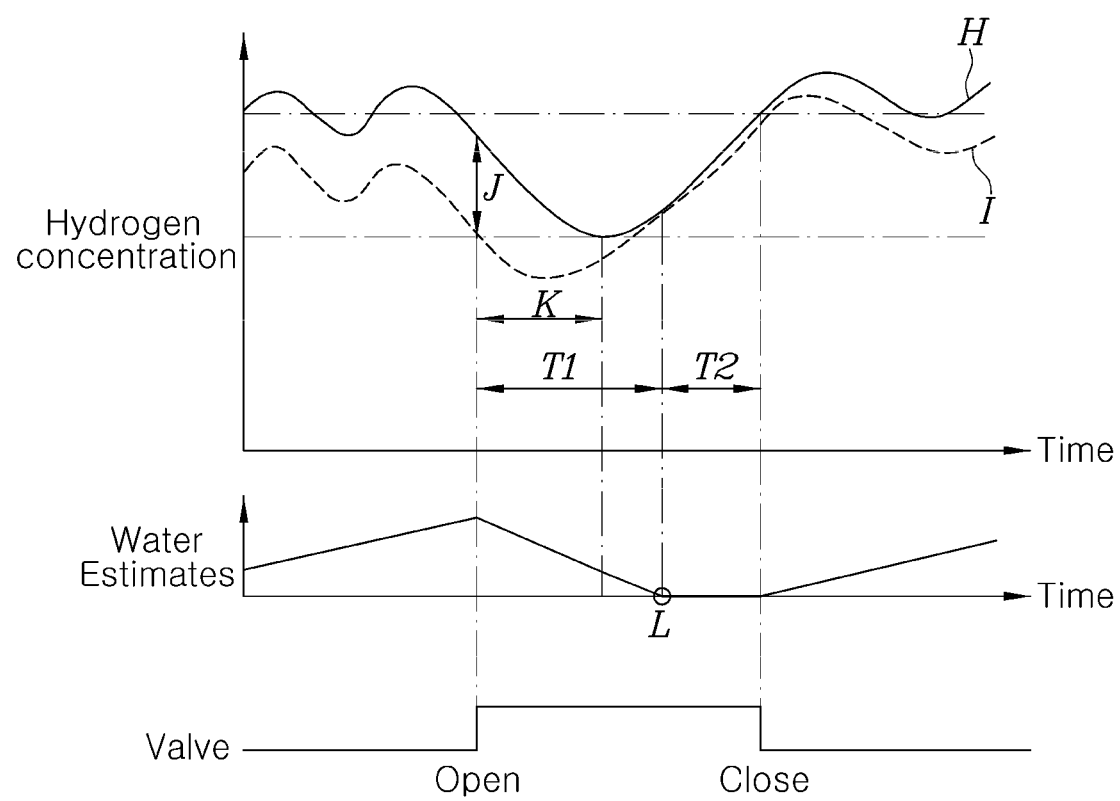
FIG. 4 is a view showing that a discharge valve is opened on the basis of hydrogen concentration of an anode that reflects a condensate water discharge delay time.

FIG. 1 is a view showing a fuel cell system according to an exemplary embodiment of the present disclosure, FIG. 2 is a flowchart of a method of controlling a fuel cell system according to an exemplary embodiment of the present disclosure, FIG. 3 is a view showing a process of calculating a condensate water discharge amount of an anode 410 of a fuel cell stack 400 on the basis of a differential pressure table of an inlet pressure and an outlet pressure of a discharge valve 100, and FIG. 4 is a view showing that the discharge valve 100 is opened on the basis of hydrogen concentration the anode 410 that reflects a condensate water discharge delay time.

Referring to FIG. 1, a fuel cell system according to the present disclosure may comprise a discharge valve 100 configured to adjust a flow rate between an inlet and an outlet, which may be connected at the inlet to a water trap 110 connected to an anode 410 of a fuel cell stack 400, and may be connected at the outlet to an external exhaust line; and a controller 300 deriving an error value on the basis of a difference between condensate water production amount and discharge amount of the anode 410 of the fuel cell stack 400 when the discharge valve 100 is in the open state, correcting the condensate water production amount of the anode 410 on the basis of the error value with the discharge valve 100 closed, and opening the discharge valve 100 when the corrected condensate water production amount exceeds a predetermined first reference value.

In order to help to understand the present disclosure, a schematic configuration of a common fuel cell system is described first with reference to FIG. 1.

A fuel supply system that may be configured to supply hydrogen that is fuel to a fuel cell stack 400 is shown at the right side in FIG. 1, an air supply system that may be configured to supply oxygen that is an oxidizer required for an electrochemical reaction is shown at the left side in FIG. 1, and a heat management system that uses cooling water, etc. to control the temperature of the fuel cell stack 400 is shown at the center in FIG. 1.

The fuel supply system may be configured to depressurize and may be configured to supply compressed hydrogen in a hydrogen tank 210 to an anode 410 of the fuel cell stack 400, the air supply system may be configured to supply external air suctioned by operating an air compressor 500 to a cathode 420 of the fuel cell stack 400, and the heat management system may be configured to circulate cooling water through a cooling line 700 by driving a cooler 720, thereby preventing the fuel cell stack 400 from being overheated by an electrochemical reaction.

In detail, the fuel supply system may be disposed in a hydrogen supply line through which hydrogen may be supplied to the anode 410 of the fuel cell stack 400 from the hydrogen tank 210 and a hydrogen discharge line through which non-reacting hydrogen may be discharged to the outside.

The hydrogen tank 210 storing compressed hydrogen may be disposed at the front end of the hydrogen supply line and the rear end of the hydrogen supply line may be connected to the anode 410. A supply valve 200, a hydrogen nozzle pressure sensor 230, an ejector 220, and a hydrogen low-pressure sensor 240 are sequentially disposed between the hydrogen tank 210 and the anode 410.

The supply valve 200 may be configured to adjust the flow rate of hydrogen that may be supplied to the anode 410 from the hydrogen tank 210 and the ejector 220 may be configured to depressurize compressed hydrogen by spraying high-pressure hydrogen using a nozzle. The hydrogen nozzle pressure sensor 230 measures the pressure of hydrogen flowing into the ejector 220 from the supply valve 200 and the hydrogen low-pressure sensor 240 measures the pressure of hydrogen flowing into the anode 410 through the ejector 220.

The front end of the hydrogen discharge line may be connected to the anode 410 and the rear end thereof may be connected to the external exhaust line. The fluid that may be discharged through the hydrogen discharge line may comprise both non-reacting hydrogen and condensate water (water) that may be a byproduct of an electrochemical reaction. Accordingly, a water tramp 110 that collects and discharges condensate water to the outside may be disposed in the hydrogen discharge line and the condensate water, before being discharged to the outside, flows into an air humidifier 600 and may be configured to be used to humidify air that may be supplied to the cathode 420.

The discharge valve 100 may be disposed between the water trap 110 and the air humidifier 600. The discharge valve 100 may be understood as meaning an integrated valve in which the functions of a purge valve and a drain valve of the related art are integrated.

Next, the air supply system may be disposed in an air supply line 510 through which air may be supplied to the cathode of the fuel cell stack 400 from the outside and an air discharge line 520 through which post-reaction air may be discharged to the outside. Though not shown in FIG. 1, it is apparent in the field of the present disclosure that the air supply system may also include a plurality of sensors that measures the pressure of air.

The air compressor 500 that suctions external air may be disposed at the front end of the air supply line 510 and the rear end of the air supply line 510 may be connected to the cathode 420. Moisture (water) functions as a medium of protons in a fuel cell. Accordingly, the air that has passed through the air compressor 500 may be configured to be appropriately humidified by the air humidifier 600 before flowing into the cathode 420.

For reference, the air humidifier 600 may be disposed in both the air supply line 510 and the air discharge line 520. The air humidifier 600 generally has a specific membrane therein that may be configured to transmit moisture. The inside from the membrane is called a lumen side and the outside is a shell side.

Air that flows into the air humidifier 600 in the air supply line 510 passes through the lumen side and air flowing back into the air humidifier 600 in the air discharge line 520 flows into the shell side. The air flowing back into the air humidifier 600 in the air discharge line 520 may comprise a small amount of moisture produced by an electrochemical reaction, so the moisture humidifies air while flowing from the shell side and the lumen side.

Meanwhile, the heat management system may comprise a cooling line 700 through which cooling water may be circulated, a cooler 720 that may be disposed in the cooling line 700 and generates flow of cooling water, and a cooling water temperature sensor that measures the temperature of cooling water.

The fuel cell system may further include a high-voltage junction box (not shown) connected to the fuel cell stack 400 through a high-voltage line (not shown), supplied with power from a fuel cell, and supplying power to a load (not shown) of a vehicle. A current sensor (not shown) that measures the intensity of a current generated by the fuel cell stack 400 may be disposed in the high-voltage line (not shown). The load of a vehicle may be understood as including other high-voltage accessories that requires power such as a motor, a heater, an air conditioner, a cooling fan, etc. of a vehicle.

The fuel cell system according to the present disclosure may be configured to estimate a condensate water production amount of the anode 410 of the fuel cell stack 400 on the basis of values measured by the hydrogen nozzle pressure sensor 230, the hydrogen low-pressure sensor 240, the cooling water temperature sensor 710, and the current sensor (not shown) described above, to correct the condensate water production amount estimation value in accordance with a predetermined method to be described below, and to open the discharge valve 100 on the basis of the corrected condensate water production amount.

In detail, the controller 300 of the fuel cell system according to the present disclosure may be configured to derive the difference of condensate water production amount and discharge amount of the anode 410 of the fuel cell stack 400 'with the discharge valve 100 open'.

The detailed principle of calculating the condensate water discharge amount of the anode 410 will be described below.

The condensate water production amount of the anode 410 may be configured to be estimated through a data map configured in advance on the basis of the pressure of hydrogen and air, the temperature of cooling water, an output current of the fuel cell stack 400, etc. The detailed method and operation principle for estimating the condensate water production amount of the anode 410 are well known in the art, so they are not described herein.

The controller 300 of the present disclosure may be configured to correct the condensate water production amount of the anode 410 'with the discharge valve 100 closed' using the derived error value, and may be configured to open the discharge valve 100 when the corrected condensate water production amount exceeds a predetermined first reference value.

That is, the controller 300 of the present disclosure may be configured to derive the condensate water production amounts of the anode 410 when the discharge valve 100 in in an open state and closed state, respectively. The 'condensate water production amount of the anode 410 derived with the discharge valve 100 open' may be used to derive an error value and the 'condensate water production amount of the anode 410 derived with the discharge valve 100 closed' may be the final correction target.

For reference, the predetermined first reference value may be understood as a minimum reference value on the basis of which it may be possible to determine that the capacity of the water trap 110 is exceeded or that there is a possibility of a flooding phenomenon in which water is excessively accumulated in the fuel cell stack 400. The first reference value may be made into a datum through several experiments and stored in a memory (not shown) disposed in the controller 300.

As a result, it may be possible to improve reliability in control by opening the discharge valve 100 on the basis of the corrected condensate water production amount and there is an effect that the performance of a fuel cell is improved by preventing a flooding phenomenon of the fuel cell stack 400 and preventing the that capacity of the water trap 110 is exceeded.

Hereafter, the principle of calculating a condensate water production amount of the anode 410 is described in detail with reference to FIG. 3.

FIG. 3 is a view showing a process of calculating a condensate water discharge amount of the anode 410 of the fuel cell stack 400 on the basis of a differential pressure table of an inlet pressure and an outlet pressure of the discharge valve 100.

Referring to FIG. 3, the controller 300 of the fuel cell system according to the present disclosure may be configured to derive a differential pressure table of an inlet pressure and an outlet pressure of the discharge valve 100 when the discharge valve 100 is in an open state, and may be configured to calculate a condensate water discharge amount of the anode 410 of the fuel cell stack 400 on the basis of the differential pressure table.

In FIG. 3, the section A is a section in which only condensate water is discharged, the section B is a section in which gas (hydrogen, nitrogen, etc.) and condensate water are discharged together, and the section C is a section in which only gas is discharged.

Further, in FIG. 3, the region D is a 'gas discharge amount of the anode 410', the region E is a 'second differential pressure accumulation amount', the region F is a 'first differential pressure accumulation amount', and the region G is a 'condensate water discharge amount of the anode 410'. The first differential pressure accumulation amount and the second differential pressure accumulation amount will be described below.

The region '0~T3' on the x-axis in FIG. 3 is the period from an opening time point and a closing time point of the discharge valve 100, that is, may be understood as the same meaning as an 'open state of the discharge valve 100' in the present disclosure. The region '0~T1' is an expected discharge time of condensate water and the section 'T2' is an expected discharge time of gas.

In the present disclosure, the 'differential pressure table' may be derived as a graph in which the x-axis is set as a valve opening time and the y-axis is set as a differential pressure of an inlet pressure and an outlet pressure of the discharge valve 100 (hereafter, referred to as a 'differential pressure of the discharge valve 100'). That is, the differential pressure table may be understood as a graph showing differential pressure variation of the discharge valve 100 over time when the discharge valve 100 is in an open state.

The controller 300 of the present disclosure may be configured to calculate a condensate water discharge amount of the anode 410 of the fuel cell stack 400 on the basis of the differential pressure table.

In detail, the controller 300 of the fuel cell system according to the present disclosure may be configured to calculate the first differential pressure accumulation amount F while condensate water of the anode 410 of the fuel cell stack 400 is discharged, from the differential pressure table and may be configured to calculate a condensate water discharge amount G of the anode 410 of the fuel cell stack 400 on the basis of the first differential pressure accumulation amount F.

The flow rate Q of gas that has passed through a predetermine section is proportioned to the differential pressure ΔP of the pressures at the inlet and the outlet of the section. That is, expression 'Q=ΔP×Cons.' is possible, in which 'Cons.' is a proportional constant that may change depending on the acceleration of gravity, the speed of fluid, and specific weight.

Accordingly, the controller 300 of the present disclosure may be configured to calculate the condensate water discharge amount G of the anode 410 of the fuel cell stack 400 by multiplying the first differential pressure accumulation amount F by a 'proportional constant while condensate water is discharged'.

Meanwhile, the first differential pressure accumulation amount F may be configured to be calculated on the basis of the differential pressure table and a gas discharge amount D of the anode 410 of the fuel cell stack 400 calculated when the discharge valve 100 is in the open state.

In detail, the controller 300 of the fuel cell system according to the present disclosure may be configured to calculate a second differential pressure accumulation amount E while gas of the anode 410 of the fuel cell stack 400 is discharged, from the differential pressure table on the basis of the gas discharge amount D and the differential pressure table, may be configured to calculate a condensate water discharge time of the anode 410 of the fuel cell stack 400 on the basis of the second differential pressure accumulation amount E and the differential pressure table, and may be configured to calculate a first differential pressure accumulation amount F by integrating the differential pressures of the discharge valve 100 for the condensate water discharge time.

The controller 300 of the fuel cell system according to the present disclosure may be configured to calculate, as the condensate water discharge time, time at which the accumulation amount of differential pressures accumulated reversely from the closing time point of the discharge valve 100 is the same as (e.g., equal to) the second differential pressure accumulation amount E in the differential pressure table.

The gas discharge amount D of the anode 410 of the fuel cell stack 400 calculated when the discharge valve 100 is in the open state may be derived on the basis of the flow rate of hydrogen that is supplied to the anode 410, the flow rate of hydrogen that is consumed at the anode 410, and flow rate variation of the gas in the anode 410.

In detail, the flow rate of hydrogen that is supplied to the anode 410 may be configured to be derived on the basis of the difference between a hydrogen pressure value measured by the hydrogen nozzle pressure sensor 230 and a hydrogen pressure value measured by the hydrogen low-pressure sensor 240, the flow rate of hydrogen that is consumed at the anode 410 may be configured to be derived on the basis of Ideal Gas Equation, and the flow rate variation of the gas in the anode 410 may be configured to be derived on the basis of Boyle-Charles law.

The detailed method and operation principle of deriving the gas discharge amount D of the anode 410, the flow rate of hydrogen that is supplied to the anode 410, the flow rate of hydrogen that is consumed at the anode 410, and the flow rate variation of the gas in the anode 410 are well known in the art, so they are not described in detail herein.

Meanwhile, the controller 300 of the present disclosure calculates a second differential pressure accumulation amount E while gas of the anode 410 of the fuel cell stack 400 is discharged, from the differential pressure table on the basis of the gas discharge amount D and the differential pressure table.

As described above, since the flow rate Q of gas that has passed through a predetermine section is proportioned to the differential pressure ΔP of the pressures at the inlet and the outlet of the section, it is possible to calculate a second differential pressure accumulation amount E by dividing the gas discharge amount D by a 'proportional constant while gas is discharged'.

The controller 300 of the present disclosure calculates a condensate water discharge time of the anode 410 of the fuel cell stack 400 on the basis of the second differential pressure accumulation amount E and the differential pressure table.

In detail, the condensate water discharge time of the anode 410 may be configured to be calculated as time at which the accumulation amount of differential pressures reversely accumulated from the closing time point of the discharge valve 100 is the same as the second differential pressure accumulation amount E in the differential pressure table.

In FIG. 3, the time at which the accumulation amount of differential pressures reversely accumulated from 'T3' that is the closing time of the discharge valve 100 is the same as the second differential pressure accumulation amount E in the differential pressure table is indicated by 'T1'.

The controller 300 of the present disclosure calculates a first differential pressure accumulation amount F by integrating differential pressures of the discharge valve 100 for the derived condensate water discharge time, and finally calculates a condensate water discharge amount G of the anode 410 of the fuel cell stack 400 by multiplying the calculated first differential pressure accumulation amount F by the 'proportional constant while condensate water is discharged'.

As a result, it is possible to calculate a condensate water discharge amount on the basis of the gas discharge amount D of the anode 410 and the differential pressure of the discharge valve 100 (because a differential table is used) that may be configured to be easily derived by existing fuel cell systems.

Further, since an error value may be derived on the basis of a calculated condensate water discharge amount and a condensate water production amount of the anode 410 with the discharge valve 100 open, and the condensate water production amount of the anode 410 with the discharge valve 100 closed may be derived on the basis of the derived error value, there is an effect that it is possible to more accurately estimate a condensate water production amount even without adding specific components to existing fuel cell systems.

Meanwhile, the controller 300 of the fuel cell system according to the present disclosure may be configured to estimate hydrogen concentration of the anode 410 of the fuel cell stack 400 with the discharge valve 100 closed, and may be configured to open the discharge valve 100 only when the hydrogen concentration of the anode 410 is less than a predetermined second reference value.

As described in the background, since a small amount of non-reacting hydrogen is included in exhaust gas discharged out of a vehicle, the hydrogen exhaust concentration of fuel cell vehicles are presently globally limited by common rules to prevent excessive discharge of hydrogen gas.

At present, the maximum allowable concentration of hydrogen gas that is discharged from fuel cell systems under GTR that is being globally applied is 8% or less, and the average measured for 3 seconds should not exceed 4%.

That is, the 'predetermined second reference value' in the present disclosure may be understood as a hydrogen exhaust concentration reference under GTR.

In detail, when the hydrogen concentration of the anode 410 is less than the hydrogen exhaust concentration reference under GTR, the discharge valve 100 is opened, and when the hydrogen concentration of the anode 410 is the hydrogen exhaust concentration reference under GTR or more, the discharge valve 100 keeps closed.

For reference, the hydrogen concentration of the anode 410 may be configured to be derived by dividing the number of moles of hydrogen in the anode 410 by the number of moles of the entire gas in the anode 410. In addition to hydrogen gas, nitrogen diffused from the cathode 420 and vapor vaporizing from a byproduct (water) of an electrochemical reaction also exist in the anode 410. Accordingly, it is possible to derive the number of moles of hydrogen in the anode 410 by subtracting the number of moles of nitrogen and vapor from the number of moles of the entire gas in the anode 410.

The number of moles of the entire gas in the anode 410 may be configured to be calculated on the basis of Ideal Gas Equation, the number of moles of nitrogen and vapor may be configured to be derived on the basis of Fick's law and the flow rate per unit time of the gases that are discharged by purging.

The detailed method and operation principle for deriving the numbers of moles of the entire gas, and nitrogen and vapor in the anode 410 are well known in the art, so they are not described herein.

FIG. 3 is a view showing a process of calculating a condensate water discharge amount of the anode 410 of the fuel cell stack 400 on the basis of a differential pressure table of an inlet pressure and an outlet pressure of the discharge valve 100 and FIG. 4 is a view showing that the discharge valve 100 is opened on the basis of hydrogen concentration of the anode 410 that reflects a condensate water discharge delay time.

Referring to FIGS. 3 and 4, the controller 300 of a fuel cell system according to the present disclosure may be configured to calculate a condensate water discharge delay time of the anode 410 of the fuel cell stack 400 on the basis of the corrected condensate water production amount and may be configured to estimate hydrogen concentration of the anode 410 on the basis of a gas diffusion amount in the fuel cell stack 400 for the condensate water discharge delay time.

In FIG. 4, H is a curve showing a hydrogen concentration estimation value of the anode 410 derived in accordance with the related art and I is a curve showing a hydrogen concentration estimation value of the anode 410 that reflects a condensate water discharge delay time in accordance with the present disclosure.

Further, in FIG. 4, J shows the degree of reduction from the related art of the hydrogen concentration estimation value of the anode 410 that reflects a condensate water discharge delay time, K may be understood as meaning an expected discharge time of condensate water reflecting a condensate water discharge delay time, and L shows a point at which condensate water finishes being discharged.

For reference, the expected discharge time K of condensate water reflecting a condensate water discharge delay time may be derived larger or smaller than the previously derived condensate water discharge time T1.

That is, FIG. 4 is based on the case in which a condensate water production amount is smaller than an estimated amount of condensate water (a condensate water discharge delay time has a negative value), which corresponds to a situation in which the expected discharge time K of condensate water reflecting a condensate water discharge delay time may be derived smaller than the previously derived condensate water discharge time T1.

In this case, it is possible to advance an opening start time of the discharge valve in comparison to the related art, so it is possible to prevent a situation in which the hydrogen concentration in the anode 410 is insufficient.

Unlike FIG. 4, when a condensate water production amount is larger than an estimated amount of condensate water, it corresponds to a situation in which a condensate water discharge delay time has a positive value, so it corresponds to a situation in which the expected discharge time K of condensate water reflecting a condensate water discharge delay time may be derived larger than the previously derived condensate water discharge time T1.

In this case, by increasing an opening end time of the discharge valve 100 in comparison to the related art, it is possible to prevent the capability of the water trap 110 from being exceeded and it is possible to minimize a flooding phenomenon in which water is excessively accumulated in the fuel cell stack 400.

Further, the controller 300 of the present disclosure may be configured to estimate hydrogen concentration of the anode 410 on the basis of a diffusion amount of gas in the fuel cell stack 400 for a condensate water discharge delay time.

The diffusion amount of gas may be understood as the number of moles according to cross-over of hydrogen and nitrogen calculated on the basis of Fick's law.

In detail, the controller 300 of the present disclosure calculates the number of moles of nitrogen that is diffused from the cathode 420 to the anode 410 and the number of moles of hydrogen that is diffused from the anode 410 to the cathode 420 for a condensate water discharge delay time. Since variations of hydrogen and nitrogen are derived in accordance with the calculated numbers of moles, it is possible to estimate hydrogen concentration of the anode 410 on the basis of the variation of each of the gases.

The detailed method and operation principle for estimating hydrogen concentration of the anode 410 are well known in the art, so they are not described herein.

FIG. 2 is a flowchart of a method of controlling a fuel cell system according to an embodiment of the present disclosure.

Referring to FIG. 2, a method of controlling a fuel cell system according to the present disclosure may comprise deriving an error value on the basis of the difference between condensate water production amount and discharge amount of an anode of a fuel cell stack with a discharge valve open by means of a controller (S100); correcting the condensate water production amount of the anode on the basis of the error value when the discharge valve is in the closed state by means of the controller (S210, S220); and opening the discharge valve when the corrected condensate water production amount exceeds a predetermined first reference value by means of the controller (S500, S510).

In detail, in the driving of an error value (S100) of the method of controlling a fuel cell system according to the present disclosure, the controller may be configured to derive a differential pressure table of an inlet pressure and an outlet pressure of the discharge valve when the discharge valve is in an open state (S120) and may be configured to calculate a condensate water discharge amount of the anode of the fuel cell stack on the basis of the differential pressure table (S180).

For reference, the 'open state of the discharge valve 100' in the present means the period from an opening time point and a closing time point of the discharge valve 100, so the differential pressure table may be understood as being continuously derived until the discharge valve 100 is closed. That is, the method of controlling a fuel cell system according to the present disclosure may be configured to close the discharge valve (S140) when a closing condition of the discharge valve is satisfied (S130) after the discharge valve 100 is opened. The 'closing condition of the discharge valve' may be understood as meaning all states in which it is no longer required to open the discharge valve 100, including the case in which the corrected condensate water production amount is a the first reference value or less or hydrogen concentration of the anode 410 is a second reference value or more.

In the driving or an error value (S100) of the method of controlling a fuel cell system according to the present disclosure, it is possible to calculate a first differential pressure accumulation amount while condensate water of the anode of the fuel cell stack is discharged, from the differential table (S170), and it is possible to calculate a condensate water discharge amount of the anode of the fuel cell stack on the basis of the first differential pressure accumulation amount (S180).

Further, in the driving or an error value (S100) of the method of controlling a fuel cell system according to the present disclosure, the controller may be configured to calculate a gas discharge amount of the anode of the fuel cell stack when the discharge valve is in the open state (S110) and may be configured to calculate a first differential pressure accumulation amount on the basis of the gas discharge amount and the differential pressure table (S170).

In more detail, in the driving or an error value (S100) of the method of controlling a fuel cell system according to the present disclosure, the controller may be configured to calculate a second differential pressure accumulation amount while gas of the anode of the fuel cell stack is discharged, from the differential pressure table on the basis of the gas discharge amount and the differential pressure table (S150), may be configured to calculate a condensate water discharge time of the anode of the fuel cell stack on the basis of the second differential pressure accumulation amount and the differential pressure table (S160), and may be configured to calculate a first differential pressure accumulation amount by integrating the differential pressures of the discharge valve for the condensate water discharge time (S170).

Further, in the driving or an error value (S100) of the method of controlling a fuel cell system according to the present disclosure, the controller may be configured to calculate, as the condensate water discharge time, time at which the accumulation amount of differential pressures accumulated reversely from the closing time point of the discharge valve is the same as the second differential pressure accumulation amount in the differential pressure table (S160).

Meanwhile, the method of controlling a fuel cell system according to the present disclosure further include calculating a condensate water discharge delay time of the anode of the fuel cell stack on the basis of the corrected condensate water production amount by means of the controller (S300) after the correcting of the condensate water production amount of the anode (S210, S200). In the opening of the discharge valve (S500, S510), the controller estimate hydrogen concentration of the anode of the fuel cell stack on the basis of a gas diffusion amount in the fuel cell stack for the condensate water discharge delay time when the discharge valve is in the closed state (S400), and may be configured to open the discharge valve when the hydrogen concentration of the anode is less than a predetermined second reference value (S410).

In the steps of the method of controlling a fuel cell system according to the present disclosure, the detailed control method and operation principle by the controller 300 are the same, as described above with the fuel cell system according to the present disclosure, so they are not repeatedly described.

According to the fuel cell system of the present disclosure and the method of controlling the fuel cell system described above, there is an advantage that it is possible to more accurately estimate a condensate water production amount of the anode 410 by correcting a condensate water production amount on the basis of a gas discharge amount of the anode 410 and the differential pressure of the discharge valve 100 when the discharge valve 100 is open even without adding a specific device, and reliability in control is improved by opening the discharge valve 100 on the basis of the corrected condensate water production amount.

Although the present disclosure was provided above in relation to specific embodiments shown in the drawings, it is apparent to those skilled in the art that the present disclosure may be changed and modified in various ways without departing from the scope of the present disclosure, which is described in the following claims.

What is claimed is:
1. A fuel cell system comprising:
a discharge valve configured to adjust a flow rate between an inlet and an outlet,
wherein the discharge valve is connected:
at the inlet to a water trap connected to an anode of a fuel cell stack, and
at the outlet to an external exhaust line; and
a controller configured to:
derive an error value on based on a difference between a condensate water production amount and a con- densate water discharge amount of the anode of the fuel cell stack when the discharge valve is in an open state;
correct the condensate water production amount of the anode based on an error value when the discharge valve is in a closed state, generating a corrected condensate water production amount; and
open the discharge valve when the corrected condensate water production amount exceeds a predetermined first reference value.

2. The fuel cell system of claim 1, wherein the controller is configured to:
derive a differential pressure table of an inlet pressure and an outlet pressure of the discharge valve when the discharge valve is in the open state; and
calculate a condensate water discharge amount of the anode of the fuel cell stack based on the differential pressure table.

3. The fuel cell system of claim 2, wherein the controller is configured to:
calculate, from the differential pressure table, a first differential pressure accumulation amount while condensate water of the anode of the fuel cell stack is discharged; and
calculate the condensate water discharge amount of the anode of the fuel cell stack based on the first differential pressure accumulation amount.

4. The fuel cell system of claim 3, wherein the controller is configured to:
calculate a gas discharge amount of the anode of the fuel cell stack when the discharge valve is in the open state; and
calculate the first differential pressure accumulation amount based on the gas discharge amount and the differential pressure table.

5. The fuel cell system of claim 4, wherein the controller is configured to:
calculate, from the differential pressure table, a second differential pressure accumulation amount while gas of the anode of the fuel cell stack is discharged based on the gas discharge amount and the differential pressure table;
calculate a condensate water discharge time of the anode of the fuel cell stack based on the second differential pressure accumulation amount and the differential pressure table; and
calculate the first differential pressure accumulation amount by integrating differential pressures of the discharge valve for the condensate water discharge time.

6. The fuel cell system of claim 5, wherein the controller is configured to:
calculate, as the condensate water discharge time, a time at which an accumulation amount of differential pressures, accumulated reversely from a closing time point of the discharge valve, equals the second differential pressure accumulation amount in the differential pressure table.

7. The fuel cell system of claim 1, wherein the controller is configured to:
estimate hydrogen concentration of the anode of the fuel cell stack when the discharge valve is in the closed state; and
open the discharge valve when the hydrogen concentration of the anode is less than a predetermined second reference value.

8. The fuel cell system of claim 7, wherein the controller is configured to:
calculate a condensate water discharge delay time of the anode of the fuel cell stack based on the corrected condensate water production amount; and
estimate a hydrogen concentration of the anode based on a diffusion amount of gas in the fuel cell stack for the condensate water discharge delay time.

9. A method of controlling a fuel cell system, the method comprising:
deriving, by a controller of a fuel cell system, an error value based on a difference between a condensate water production amount and a condensate water discharge amount of an anode of a fuel cell stack when a discharge valve is in an open state,
wherein the fuel cell system comprises:
the discharge valve configured to adjust a flow rate between an inlet and an outlet,
wherein the discharge valve is connected:
at the inlet to a water trap connected to the anode of the fuel cell stack, and
at the outlet to an external exhaust line; and
the controller configured to:
derive the error value on based on the difference between the condensate water production amount and the condensate water discharge amount of the anode of the fuel cell stack when the discharge valve is in the open state;
correct the condensate water production amount of the anode based on an error value when the discharge valve is in a closed state, generating a corrected condensate water production amount; and
open the discharge valve when the corrected condensate water production amount exceeds a predetermined first reference value;
correcting, by the controller, the condensate water production amount of the anode based on the error value when the discharge valve is in the closed state; and
opening, by the controller, the discharge valve when the corrected condensate water production amount exceeds the predetermined first reference value.

10. The method of claim 9, wherein the deriving comprises:
deriving, using the controller, a differential pressure table of an inlet pressure and an outlet pressure of the discharge valve when the discharge valve is in the open state; and
calculating the condensate water discharge amount of the anode of the fuel cell stack based on the differential pressure table.

11. The method of claim 10, wherein the deriving comprises:
calculating a first differential pressure accumulation amount while condensate water of the anode of the fuel cell stack is discharged, from the differential pressure table; and
calculating the condensate water discharge amount of the anode of the fuel cell stack based on the first differential pressure accumulation amount.

12. The method of claim 11, wherein the deriving comprises:
calculating, using the controller, a gas discharge amount of the anode of the fuel cell stack when the discharge valve is in the open state; and calculating the first differential pressure accumulation amount based on the gas discharge amount and the differential pressure table.

13. The method of claim 12, wherein the deriving comprises:
   calculating, from the differential pressure table, using the controller, a second differential pressure accumulation amount while gas of the anode of the fuel cell stack is discharged, based on the gas discharge amount and the differential pressure table;
   calculating a condensate water discharge time of the anode of the fuel cell stack based on the second differential pressure accumulation amount and the differential pressure table; and
   calculating the first differential pressure accumulation amount by integrating differential pressures of the discharge valve for the condensate water discharge time.

14. The method of claim 13, wherein the deriving comprises:
   using the controller, calculating, as the condensate water discharge time, a time at which an accumulation amount of differential pressures, accumulated reversely from a closing time point of the discharge valve, equals the second differential pressure accumulation amount in the differential pressure table.

15. The method of claim 9, further comprising calculating a condensate water discharge delay time of the anode of the fuel cell stack based on the corrected condensate water production amount after correcting the condensate water production amount of the anode,
   wherein the opening the discharge valve further comprises:
      estimating, using the controller, a hydrogen concentration of the anode of the fuel cell stack based on a gas diffusion amount in the fuel cell stack for the condensate water discharge delay time when the discharge valve is in the closed state; and
      opening the discharge valve when the hydrogen concentration of the anode is less than a predetermined second reference value.

* * * * *